United States Patent
Fevold et al.

(10) Patent No.: US 12,284,546 B2
(45) Date of Patent: Apr. 22, 2025

(54) PATHLOSS-BASED UPLINK SECTOR EMISSIONS MODEL FOR LTE AGGREGATE INTERFERENCE PREDICTION

(71) Applicant: The MITRE Corporation, McLean, VA (US)

(72) Inventors: Jerediah R. Fevold, McLean, VA (US); Evan G. Briggs, McLean, VA (US); Ashton R. Knight, McLean, VA (US); Jeffrey T. Correia, McLean, VA (US); Venkatesh Ramaswamy, McLean, VA (US)

(73) Assignee: The MITRE Corporation, McLean, VA (US)

( * ) Notice: Subject to any disclaimer, the term of this patent is extended or adjusted under 35 U.S.C. 154(b) by 286 days.

(21) Appl. No.: 18/049,177

(22) Filed: Oct. 24, 2022

(65) Prior Publication Data
US 2023/0413102 A1 Dec. 21, 2023

Related U.S. Application Data

(60) Provisional application No. 63/352,575, filed on Jun. 15, 2022.

(51) Int. Cl.
H04W 28/02 (2009.01)
H04B 17/391 (2015.01)
H04W 16/10 (2009.01)

(52) U.S. Cl.
CPC .... *H04W 28/0236* (2013.01); *H04B 17/3913* (2015.01); *H04W 16/10* (2013.01)

(58) Field of Classification Search
CPC .............. H04W 28/0236; H04W 16/10; H04B 17/3913
See application file for complete search history.

(56) References Cited

U.S. PATENT DOCUMENTS

| | | | |
|---|---|---|---|
| 7,773,964 B2 | 8/2010 | Ozaki et al. | |
| 9,451,484 B2 | 9/2016 | Boulton | |
| 10,390,180 B1 * | 8/2019 | Li | G01S 5/02524 |
| 10,784,972 B2 | 9/2020 | Axmon et al. | |

(Continued)

FOREIGN PATENT DOCUMENTS

WO  WO-2011029874 A1 *  3/2011  ............ H04W 16/18

OTHER PUBLICATIONS

Bensky, A., "Equivalent Isotropic Radiated Power," ScienceDirect, Short-range Wireless Communication (Third Edition), Aug. 16, 2019; 23 pages.

*Primary Examiner* — Brenda H Pham
(74) *Attorney, Agent, or Firm* — Sterne, Kessler, Goldstein & Fox P.L.L.C.

(57) ABSTRACT

Disclosed herein are system, method, and computer program product embodiments for utilizing non-RAM memory to implement a sector emissions model. In some embodiments, a sector-centric testing architecture computes aggregate interference as a sum of contributions from LITE sectors rather than UEs. This granularity enables more accurate modeling of the interference contributions by eliminating sonic of the unrealistic, constraining assumptions about UE emissions originating from the same sector. With a sector-centric architecture, different models can be used to capture intra-sector dynamics based on selected priorities.

20 Claims, 13 Drawing Sheets

(56) References Cited

U.S. PATENT DOCUMENTS

| | | | |
|---|---|---|---|
| 2002/0058503 A1* | 5/2002 | Gutowski | H04W 24/00 |
| | | | 455/67.11 |
| 2013/0115938 A1* | 5/2013 | Thiel | H04W 16/18 |
| | | | 455/423 |
| 2015/0131580 A1* | 5/2015 | Liu | H04B 7/0452 |
| | | | 370/329 |
| 2020/0037254 A1 | 1/2020 | Comsa et al. | |
| 2020/0059867 A1 | 2/2020 | Haghighat et al. | |
| 2020/0280377 A1 | 9/2020 | Haustein et al. | |

* cited by examiner

PATHLOSS-BASED UPLINK SECTOR EMISSIONS MODEL FOR LTE AGGREGATE INTERFERENCE PREDICTION

CROSS-REFERENCE TO RELATED APPLICATIONS

This application is a non-provisional which claims priority benefit to U.S. Provisional Appl. No. 63/352,575, filed Jun. 15, 2022, the contents of which are hereby incorporated by reference in its entirety.

The U.S. government has a paid-up license in this invention and the right in limited circumstances to require the patent owner to license others on reasonable terms as provided for by the terms of Contract No. 100927.10.100.KIOX.ACO awarded by the Defense information Systems Agency (DISH) and the U.S. Army.

BACKGROUND

Accurate aggregate interference prediction is needed for successful spectrum sharing between cellular networks and User Equipment (15E) receivers. More specifically, systems where interference considerations may be valuable to determining overall sector performance, need to be able to closely estimate real-world interference conditions for multiple UEs as they move through the sector and share base station resources. However, current approaches to aggregate interference modeling are still based on interference contributions from individual UEs, considered independently, with a contribution from all UEs summed to obtain a value for aggregate interference.

BRIEF DESCRIPTION OF THE DRAWINGS

The accompanying drawings are incorporated herein and form a part of the specification.

FIG. GA and GB, collectively illustrate example sector Equivalent Isotropic Radiated Power (EIRP) CDFs (Cumulative Distribution Function) for urban/suburban and rural sectors, according to some embodiments.

EEGs, 7A and 7B collectively illustrate a flow chart describing the generation of EIRP distributions using the testbed, according to some embodiments.

Figure 8:
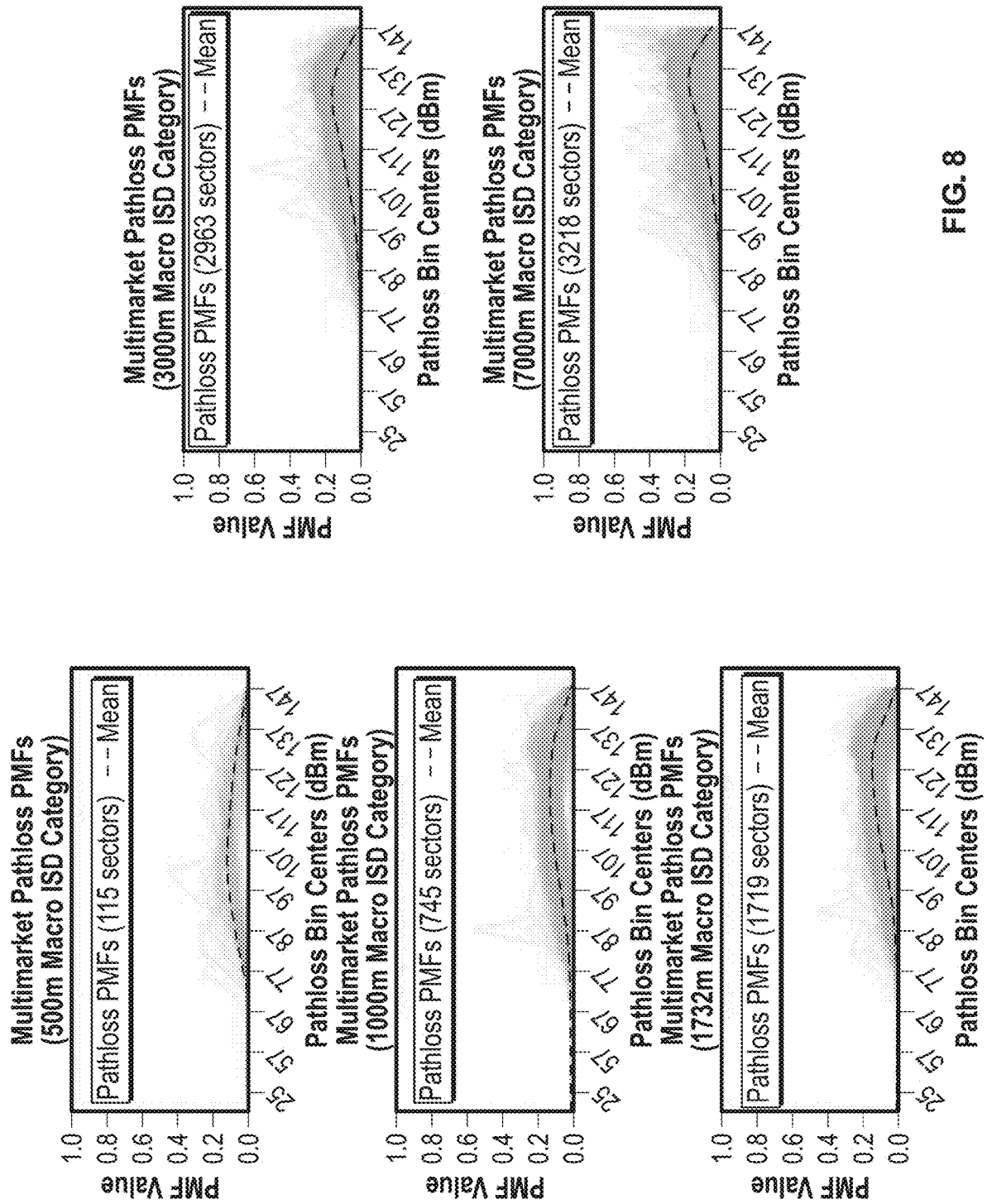

FIG. 8 illustrates example plots of the UI: PI, (Uplink Pathloss) distributions in the data corpus for each of a plurality of Inter-Site Distance (ND) categories, according to some embodiments.

Figure 9:
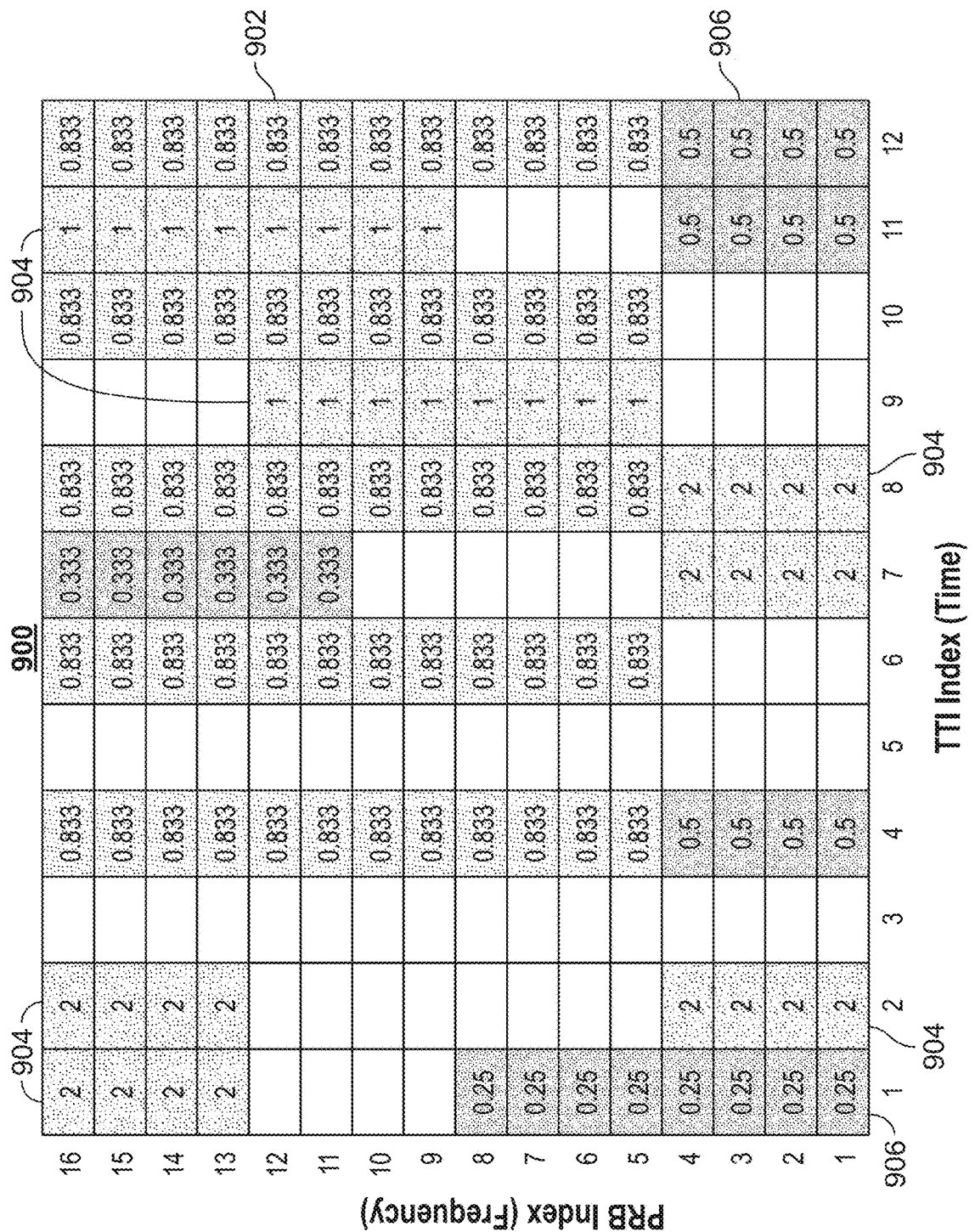

FIG. 9 illustrates an EIRP resource grid, as per some embodiments.

Figure 10:
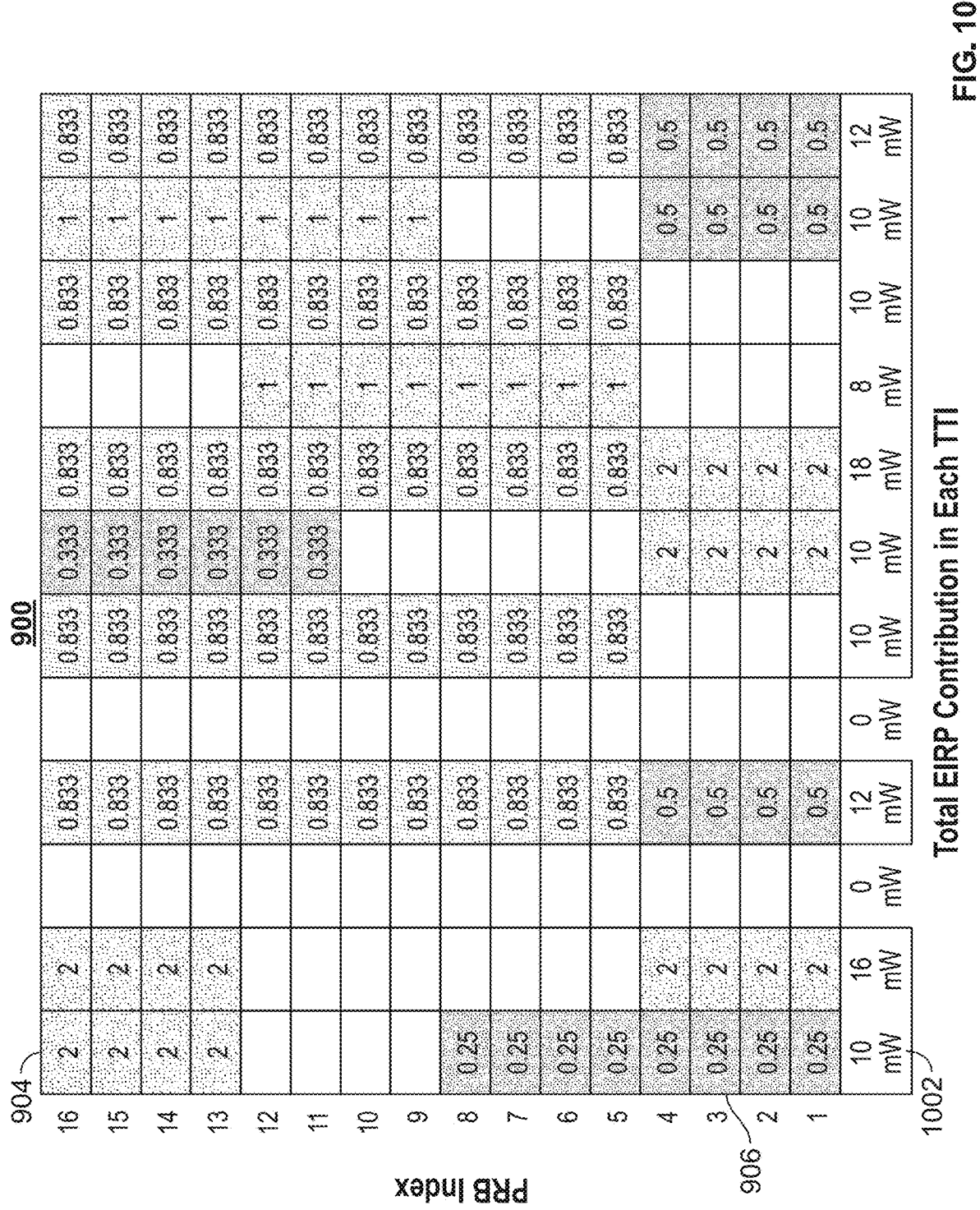

FIG. 10 illustrates a computation using the example grid from FIG. 9, as per some embodiments.

Figure 11:
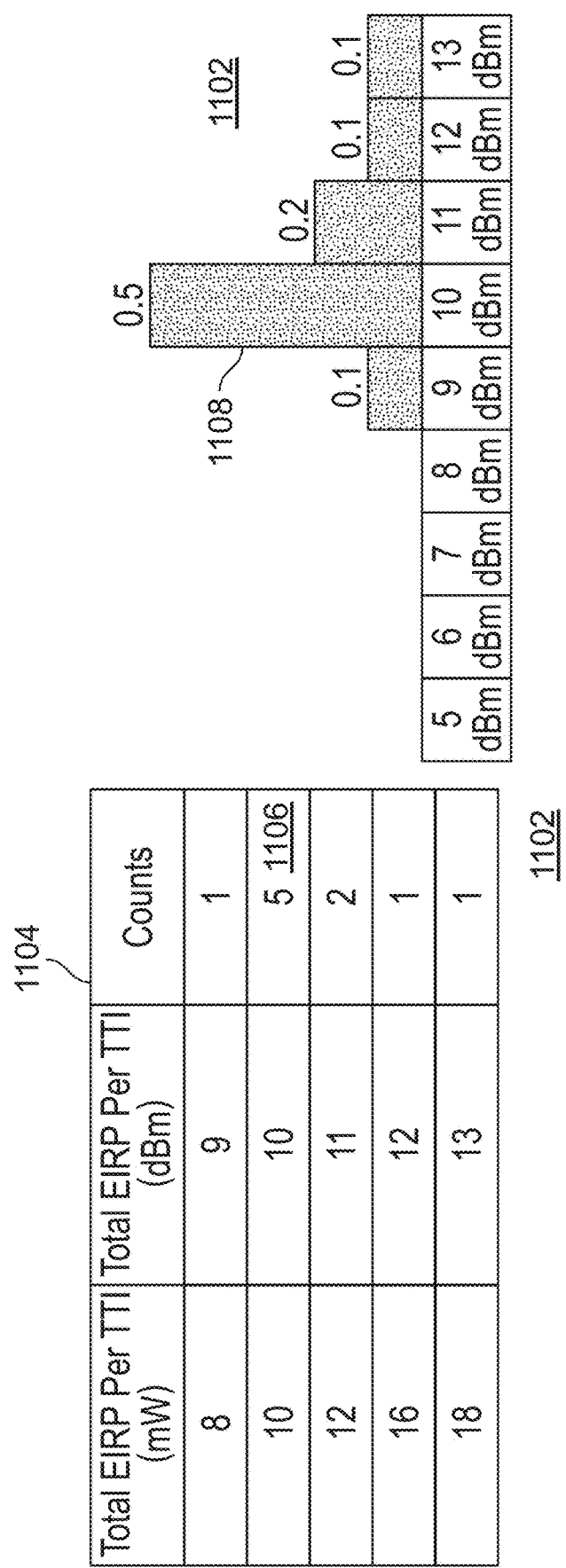

FIG. 11 illustrates a Spectral Energy Distribution (SED) computed by creating a normalized histogram of the non-zero values of total EIRP contributions, as per some embodiments.

Figure 12:
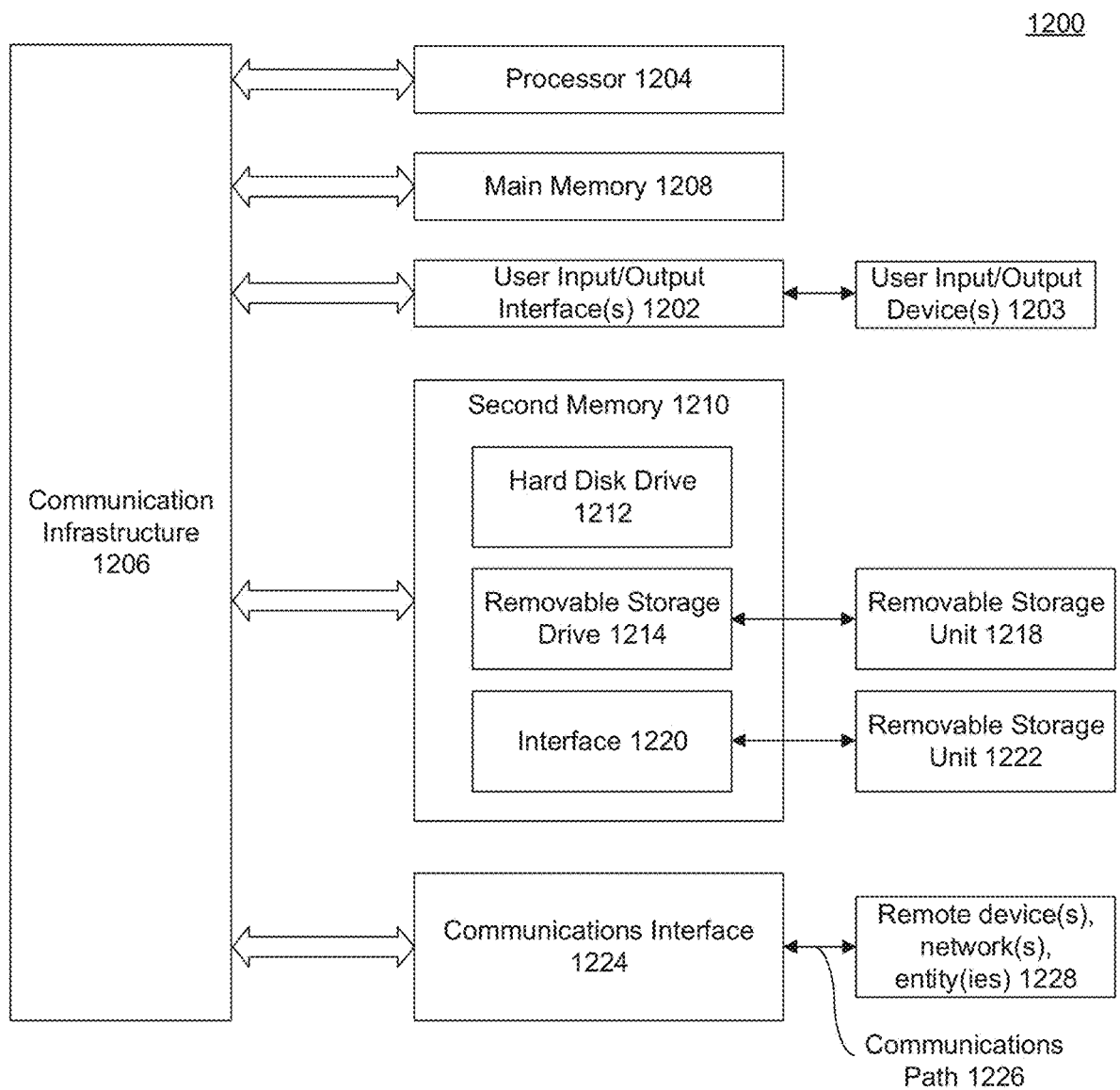

FIG. 12 is an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, that implement a method for determining sector emissions. In one embodiment, a sector emissions model models uplink emissions with a sector-centric architecture.

In the real-world, there is a great amount of correlation, in time and frequency, among the EIRP of UEs transmitting simultaneously within a sector (or even between neighboring sectors). The correlations are difficult to address mathematically because they depend on complicated processes involving a base station scheduler and performance requirements imposed by higher layers in the protocol stack. In some embodiments, the technology described herein implements a sector emissions model to demonstrate how some of these complications can be addressed empirically using a sector-centric architecture and sector emulation.

In some embodiments, the technology described herein assesses an impact of Uplink (UL) emissions on receivers occupying the same spectrum. Such assessments may require accurately predicting an aggregate interference at the victim receiver caused by emissions from, for example, LIE User Equipment (UE) spread out over a large geographic region.

In some embodiments, the technology described herein implements sector emulation to empirically model sector-wide interference contributions by matching pathloss statistics from real-world networks. Pathloss, or path attenuation, is the reduction in power density (i.e., attenuation) of an electromagnetic wave as it propagates through space. Pathloss is a major component in the analysis and design of a link budget of a telecommunication system. A link budget is an accounting of all of the power gains and losses that a communication signal experiences in a telecommunication system, from a transmitter through a communication medium such as radio waves to a receiver. Pathloss may be due to many effects, such as free-space loss, refraction, diffraction, reflection, aperture-medium coupling loss, and absorption, to name a few. Pathloss may also be influenced by terrain contours, environment (urban or rural, vegetation and foliage), propagation medium (dry or moist air), the distance between the transmitter and the receiver, the height and location of antennas, etc.

In some embodiments, a sector-centric testing architecture computes aggregate interference as a sum of contributions from LIE sectors rather than UEs. This granularity enables more accurate modeling of the interference contributions by eliminating some of the unrealistic, constraining assumptions about LIE emissions originating from the same sector. With a sector-centric architecture, different models can be used to capture intra-sector dynamics based on selected priorities.

Figure 1:
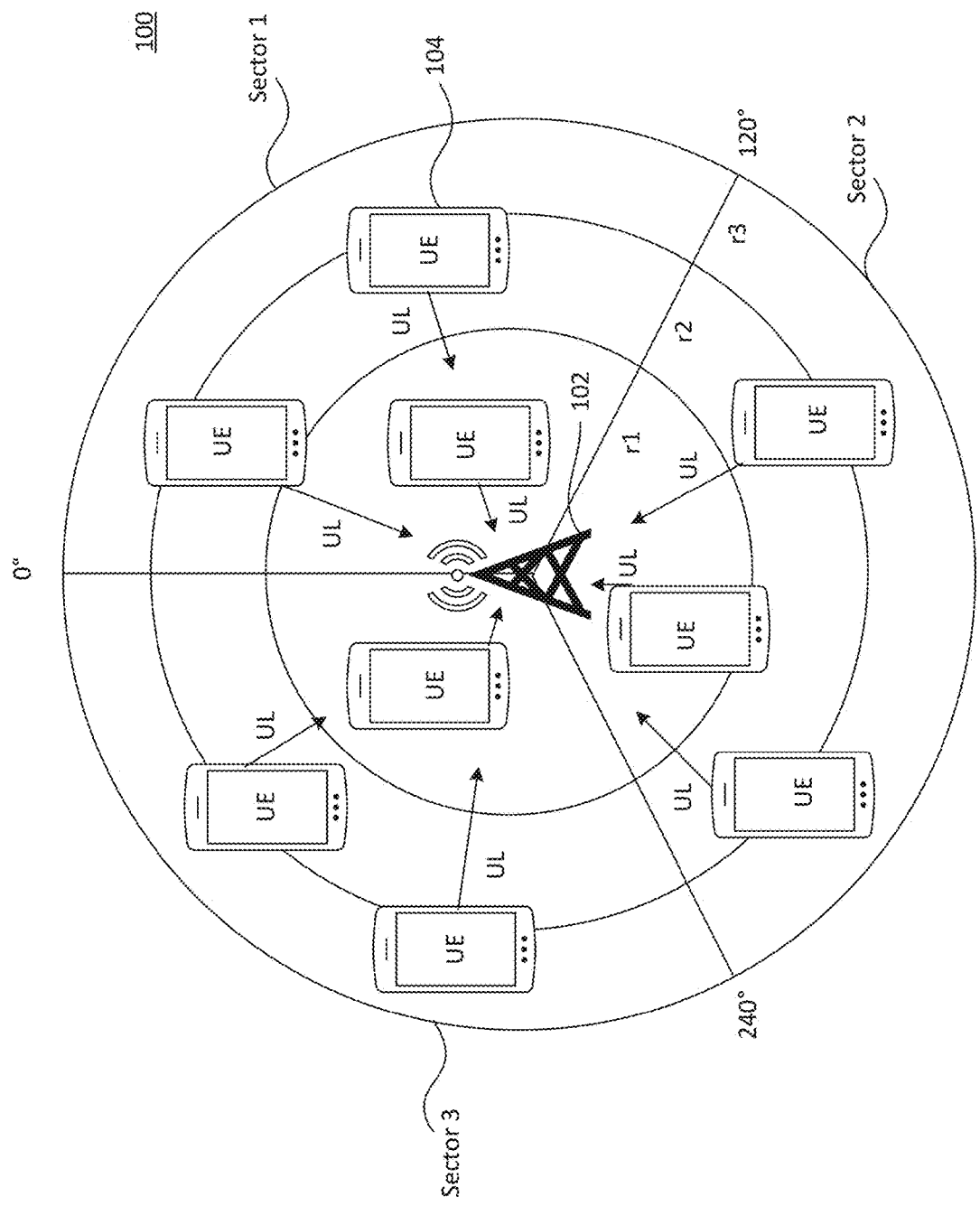
FIG. 1 illustrates a communications cell configuration, according to some embodiments.

FIG. 1 illustrates a multi-sector cell 100 with a sector antenna 102 with an eNodeB (Evolved Node B) base station configuration for cellular communications, as per some embodiments. A sector antenna is a type of directional antenna with a sector-shaped radiation pattern. The word "sector" is used in the geometric sense as some portion of a circumference of a circle, measured in degrees of arc 60°, 90° and 120° designs, are typical, often with a few degrees 'extra' to ensure overlap and mounted in multiples when wider or full-circle coverage is required. Each sector can be considered a separate cell where one or more UEs 104 may move from cell to cell, One application for these antennas is as antennas for cell phone base-station sites. For simplicity purposes, a three sector embodiment will be described herein. However, the technology disclosed herein is not limited thereto. For example, any number of sectors may be implemented using the technology described herein.

For a three sector base station configuration (each approximately 120°), a plurality of antennas may implement radiation patterns having, for example, various horizontal beam widths (e.g.,) 60°-66°. The eNodeB may include hardware that is connected to the sector antenna tower and the mobile phone network that communicates directly wirelessly with mobile handsets (UEs), like a base transceiver station (BTS). Vertical beam width may be, in one example, 15° (7.5° in each direction). Unlike antennas for commercial broadcasting, such as AM, FM and television, which must achieve line-of-sight over many miles or kilometers, there is usually a downward beam tilt or down tilt to antennas so that the base station can more effectively cover its immediate area and not cause radio frequency (RV) interference to distant cells. As shown, the coverage area may include various power levels at radial distances (r1-r3). Power levels of down link (DL) transmission levels commonly increase from center outward (i.e., UEs farther from the antenna need a more powerful signal to communicate). Power levels may be chosen based on pathloss levels. As pathloss increases with distance, UL power levels from UEs 104 also follow a similar power pattern based on their distance from the antennas. For simplicity purposes, only a single UE 104 has been numbered.

The coverage area, which is determined by the projection of the radiation pattern on the ground, can be adjusted by changing the down tilt of the antenna. However, an understanding of how user equipment (UE) 104, such as a cellular telephone, experiences uplink (UL) interference may be useful to optimize the system. In telecommunications, interference is that which modifies a signal in a disruptive manner, as it travels along a communication channel between its source and receiver. The term is often used to refer to the addition of unwanted signals to a useful signal. Common examples include, but are not limited to, Electromagnetic interference (EMI), Co-channel interference (CCI), also known as crosstalk, Adjacent-channel interference (ACT), Intersymbol interference (LSI), Inter-carrier interference (ICE), caused by doppler shift in Orthogonal Frequency-Division Multiplexing (OFDM) modulation, Common-mode interference (CMI), Conducted interference, to name a few. Radio resource management aims to reduce and control one or more of the various interferences.

As will be described in greater detail hereafter, the technology described herein implements, in one embodiment, a sector emissions model. The sector emissions model follows an aggregate interference prediction approach that models uplink emissions with a sector-centric, rather than UE-centric, architecture. In doing so, it provides a higher fidelity model with demonstrated performance improvements.

While described for fourth generation (4G LTE) implementations, the technology described herein may be implemented with fifth generation (5G) systems (e.g., using a gNodeB (gNB) base station) or other future wireless standard(s) platforms without departing from the scope described herein.

Figure 2:
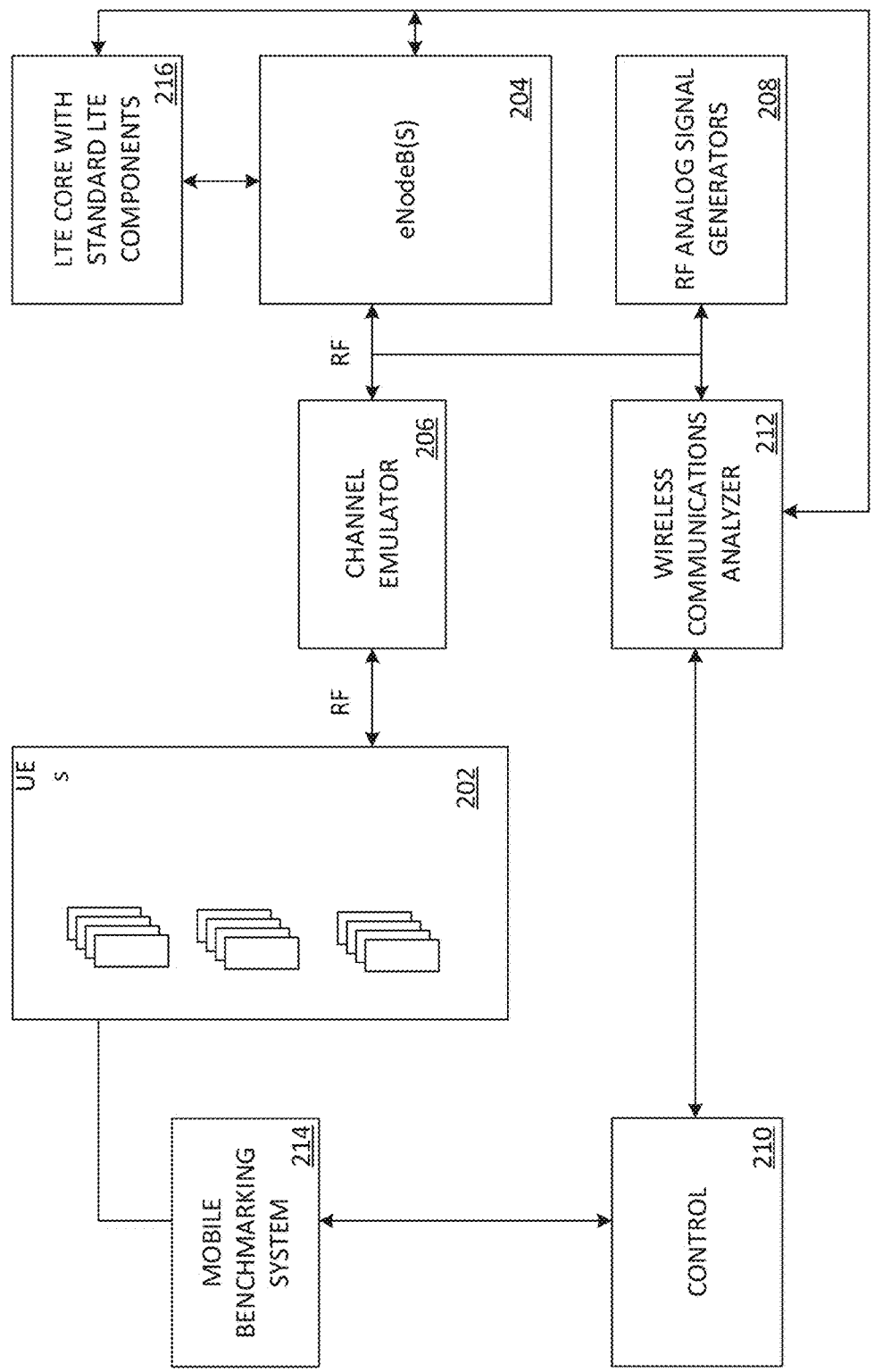
FIG. 2 illustrates a cellular testing system, according to some embodiments.

FIG. 2 illustrates a system diagram for implementing sector-based aggregate interference predictions, according to some embodiments. System 200 can be performed by processing logic that can comprise hardware (e.g., circuitry, dedicated logic, programmable logic, microcode, etc.), software (e.g., instructions executing on a processing device), or a combination thereof. It is to be appreciated that not all components may be needed to perform the disclosure provided herein. Further, some of the components may be arranged in a different order than shown in FIG. 2, as will be understood by a person of ordinary skill in the art.

System 200 implements a cellular testbed as shown in FIG. 2. Equivalent Isotropic Radiated Power (EIRP) is the total radiated power from a transmitter antenna times the numerical directivity of the antenna in the direction of the receiver, or the power delivered to the antenna times the antenna numerical gain. Sector EIRP models described herein may be developed using the testbed. The testbed enables LTE experimentation and performance and behavior monitoring in a tightly controlled environment. In some embodiments, tightly controlled means that hardware is operated in screen boxes on a private network. The screen boxes prevent outside signals, including those that might radiate from the eNodeB chassis, from entering the UE's RF frontend through unintended paths. The system is fully calibrated such that when attenuations are set, they are known to be correct and that they will correspond with expected RSRP values in the testbed. Additionally, the RF is cabled to the UEs instead of radiated, which allows precisely setting the path losses.

The testbed is configured to implement sector emulation to empirically model sector-wide interference contributions by matching pathloss statistics from real-world networks. The testbed, in some embodiments, may include commercial UEs 202 and commercial grade LTE base stations (eNodeBs) 204 that communicate (RF) with each other during the emulation. An LTE core with Standard LTE components 216 communicates with the eNodeB, as it would in a real-world setting. The LIE core with Standard. LTE components 216, may in various embodiments, implement one or more components, including, but not limited to, an Evolved Universal Terrestrial Radio Access (E-UTRA), a Mobility Management Entity (MIME), a Serving Gateway (SGW), a Packet Data Network Gateway (PGW), a Home Subscriber Server (HSS). The RF path between each UE and the eNodeB is emulated by Channel Emulator 206. The Channel Emulator 206 replicates the comprehensive noise and spatial conditions of wireless channels.

A centralized controller (210) drives the UEs 202. (e.g., with predefined scripts) and includes storage and an orchestration tool that initiates tests and collects result data, as will be described in greater detail hereafter. A wireless communications analyzer 212 is a radio air interface analyzer for mobile wireless networks (e.g., 4G) providing real-time over-the-air decoding capabilities for network analysis. The wireless communications analyzer 212 may implement synchronizing of the logs between UEs. The UE's internal logs may be used as a power reporting mechanism (e.g., historical recording).

The testbed enables high-fidelity emulation of real-world LIE sectors parameterized by key performance metrics that are provided in advance by mobile benchmarking system 214. More specifically, given a sector target pathless distribution and average network loading, the testbed can be used to emulate fine-grain UE emissions using RF analog signal generators 208 which are consistent with the sector being emulated. Various measurements of UE and eNodeB performance are collected. These include detailed uplink emission information which indicates at which LIE TTI (Transmission Time Interval), for example, a 1 millisecond subframe, that each UE transmitted, with what total power, and over what LTE physical resource blocks (PRBs).

In some embodiments, the UEs may be capable of communicating within an AWS-3 (Advanced Wireless Services-3) network. However, the techniques disclosed herein used may be applied for any frequency or range of frequencies. AWS-3 is a wireless communication frequency band of the radio spectrum. AWS-3 frequency bands are used for transmission of voice, data, video, and messaging over a cellular network. AWS-3 may include the bands 1755 to 1780 MHz and 2155 to 2180 MHz. AWS-1 is commonly used in various countries of the Americas (i.e., bands 1710 to 1755 MHz and 2110 to 2155 MHz). In some embodiments, as AWS-1 and AWS-3 are adjacent blocks of spectrum, the testbed may leverage data gathered from previously live AWS-1 networks. For this reason, in some embodiments, the technology described herein may assume metrics derived from real-world AWS-1 networks would be representative to those observed in real-world AWS-3 networks. However, one skilled in the art will appreciate that other approaches, using different real-world data points may be contemplated without departing from the scope of the technology described herein.

As will be described in greater detail hereafter, key performance indicator (KPI) data may include metrics for estimating the average physical layer network loading for each sector. In some embodiments, the KPI data may include metrics which may be used to estimate the distribution of LE connection distances from the base station. Finally, the KPI dataset may include metrics that enable the estimation of an UL pathloss distribution, corresponding to the distribution of the pathloss associated with each uplink transmission in the sector.

The testbed from FIG. 2 may be leveraged to generate the SEDs and TARs for model sectors parameterized by KPIs from a historical data corpus and network loading factors. The SED and TAR for each model sector is derived from data obtained from a testbed emulation. A testbed emulation is the instrumented operation of testbed's components for a KM collection interval (typically 15 minutes) which results in KPIs that match the desired metrics of the model sector being emulated.

Figure 3:
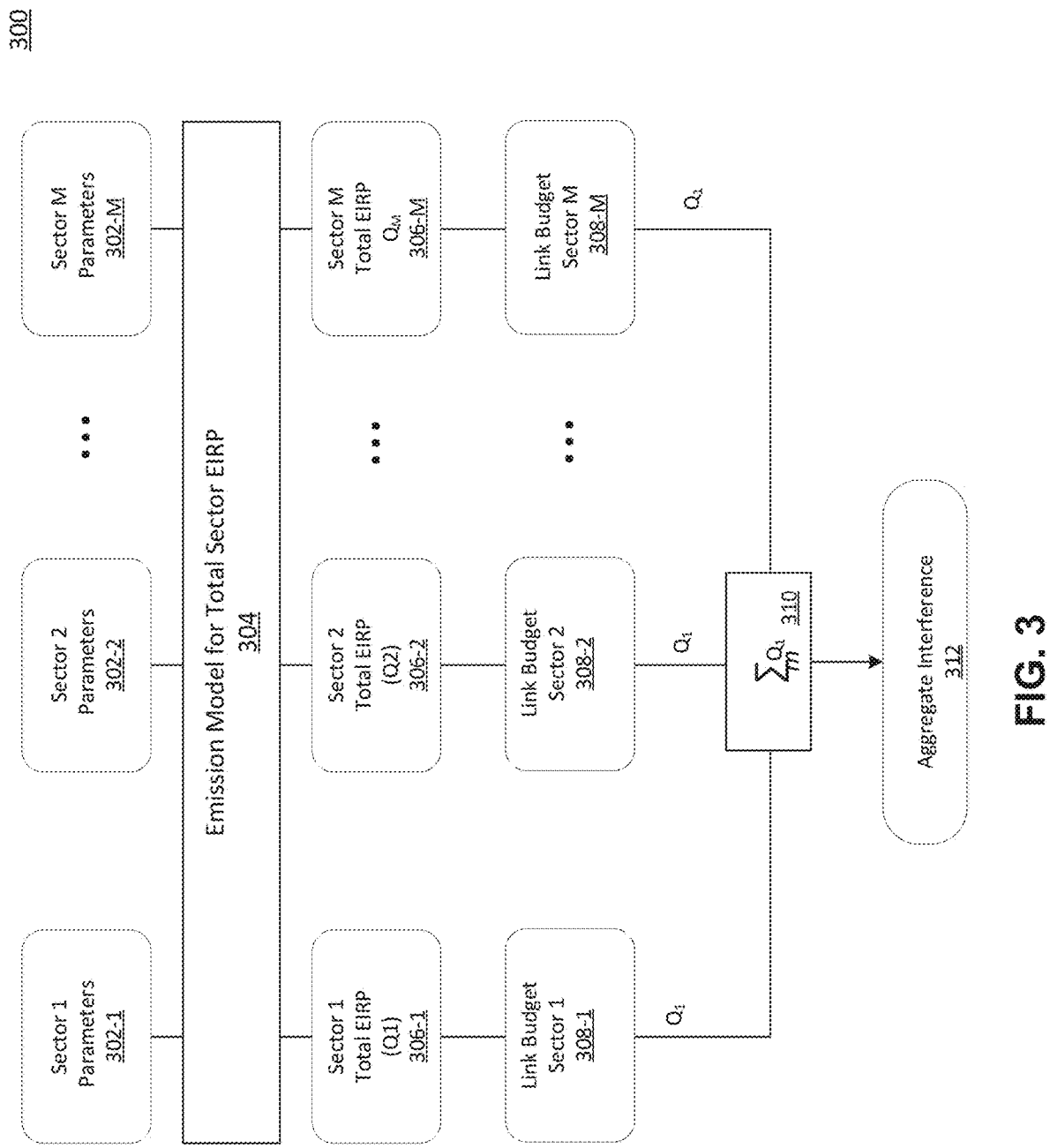
FIG. 3 illustrates a block diagram for aggregate interference computations using a sector-centric architecture, according to some embodiments.

FIG. 3 illustrates a block diagram 300 for aggregate interference computations using a sector-centric architecture, as per some embodiments. As shown, individual sectors 1-M receive their sector parameters 302 (1-M). Example sector parameters are shown in Table 1, which summarize some example parameters for a testbed configuration for model emulations.

TABLE 1

| Parameter | Value |
| --- | --- |
| Number of Physical UEs | 21 |
| Number of Cells | 1 |
| Carrier UL Center Frequency | 1710 MHZ |
| Carrier Bandwidth | 10 MHZ |
| Alpha | 0.8 |
| P0 PUSCH | −90dBm |
| Number of PUSCH Resource Blocks | 46 |

TABLE 1-continued

| Parameter | Value |
| --- | --- |
| Number of PUCCH Resource Blocks | 4 |
| Channel Model | 3GPP EPA5 |

The "Emission Model for Total Sector EIRP" block 304, is the uplink emission model that predicts a total UL EIRP contribution from individual sectors 306 (1-M). As previously described, equivalent isotropic radiated power, EIRP, is the total radiated power from a transmitter antenna times the numerical directivity of the antenna in the direction of the receiver, or the power delivered to the antenna times the antenna numerical gain. Due to the random nature of real-world environments, many of the terms in the aggregate interference link budget are random variables. However, since aggregate interference 312 is the sum 310 of interference contributions from many sources, the Central Limit Theorem suggests it will take the form of a Gaussian distribution. Furthermore, the relative size of the standard deviation with respect to the mean will fall with increased number of interference sources. In many applications, it is therefore sufficient to consider only the mean value of each random variable. However, the models described herein, in some embodiments, will define EIRP as a random variable for completeness.

In some embodiments, the technology described herein implements a sector-centric architecture, where the aggregate interference contribution of the sector is calculated by:

$$I=Q-L_{cl}-L_p-FDR-G_r-L_{pol}-L_s$$

I=Interfering signal level at the victim receiver (i.e., aggregate interference contribution)

Q=Effective Isotropic Radiated Power (EIRP) from the interference source $L_{cl}$=Total Clutter loss between interference source and victim receiver $L_p$=Propagation loss between interference source and victim receiver FDR=Frequency Dependent Rejection at the victim receiver $G_r$=Victim receiver antenna gain in the direction of the interference source $L_{pol}$=Victim receiver antenna polarization mismatch loss $L_s$=Victim receiver antenna system loss The link budget equation 308 is applied to individual sectors (1-M) instead of individual UEs. A link budget is an accounting of all of the power gains and losses that a communication signal experiences in a telecommunication system; from a transmitter, through a communication medium such as radio waves, cable, waveguide, or optical fiber, to the receiver. It is an equation giving the received power from the transmitter power, after the attenuation of the transmitted signal due to propagation, as well as the antenna gains and feedline and other losses, and amplification of the signal in the receiver or any repeaters it passes through. A link budget is a design aid, calculated during the design of a communication system to determine the received power, to ensure that the information is received intelligibly with an adequate signal-to-noise ratio. Randomly varying channel gains, such as fading, are taken into account by adding some margin depending on the anticipated severity of its effects. The amount of margin required can be reduced by the use of mitigating techniques such as antenna diversity or frequency hopping.

Figure 4:
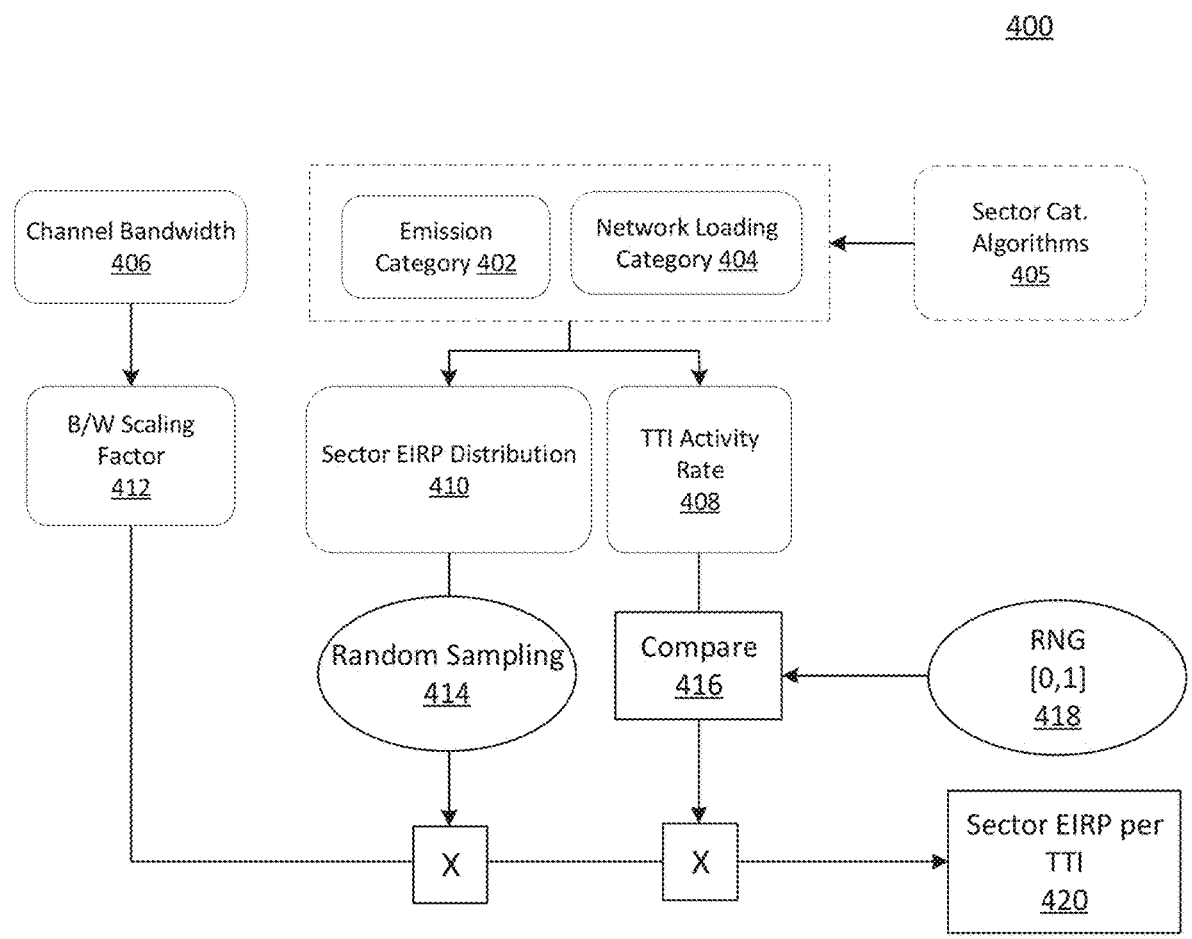
FIG. 4 illustrates a block diagram of a sector emissions model (Pathloss-Based Sector Uplink Emissions Model), according to some embodiments.

FIG. 4 illustrates a block diagram 400 of one embodiment of a sector emissions model based on the techniques described herein. In some embodiments, the model may assume there exists a category algorithm which can classify any given sector into an emission category 402 and a network loading category 404. In a non-limiting example, a sector emissions model may be compatible with sector categorization algorithms 405 for categorizing LTE sectors.

In a first non-limiting example category, a "nearest neighbor" algorithm assigns a sector to an Inter-Site Distance (ISD). ISD is a common measure for characterizing a cell site density in a mobile network. A sector's nearest neighbor is the closest (not co-located) sector that resides in a line of sight of the sector's RIB beam width. The sector's ISD category is obtained by binning a distance between a sector and its nearest neighbor to the closest representative ISD value associated with each of the ISD categories.

While LSD categories are useful when describing sectors in a network, individual sectors can also be categorized by data that defines a "sector radius" (r) corresponding to the furthest distance from which UEs can consistently connect to the cell, Assuming nearby sectors have roughly equal footprints, each ISD category can be associated with a corresponding sector radius defined by half the representative ISD value. Table 2 summarizes an example of ISD categories and the associated sector radius categories. Five ISD/Radius Categories are shown in Table 2. However, the present disclosure is not limited to specific ISD categories of frequencies.

TABLE 2

| Index Number | Representative ISD | ISD Bin Range | Representative Sector Radius | Radius Bin Range |
|---|---|---|---|---|
| 1 | 500 m | 0 m ≤ ISD < 750 m | 250 m | 0 m ≤ Radius < 375 m |
| 2 | 1000 m | 750 m ≤ ISD < 1366 m | 500 m | 375 m ≤ Radius < 683 m |
| 3 | 1732 m | 1366 m ≤ ISD < 2366 m | 866 m | 683 m ≤ Radius < 1183 m |
| 4 | 3000 m | 2366 m ≤ ISD < 5000 m | 1500 m | 1183 m ≤ Radius < 2500 m |
| 5 | 7000 m | 5000 m ≤ ISD | 3500 m | 2500 m ≤ Radius |

In some embodiments, a channel bandwidth 406 of the sector is known (e.g., as compared to a same or similar real-life sector). Once a sector has been categorized, the corresponding ITT Activity Rate (TAR) 408 and Sector EIRP Distribution (SED) 410 is determined from a table (See Table 3 below). The TAR and SED for each category are generated using high fidelity sector emulation parameterized by real-world data. The bandwidth is used to determine a scaling factor 412 that needs to be applied to account for different loading levels in cells of different bandwidths. TTI Activity Rates for different 181) and morphology categories are shown below in Table 3.

TABLE 3

| | Urban/Suburban | Rural |
|---|---|---|
| 500 m ISD | 0.70 | 0.61 |
| 1000 m ISD | 0.73 | 0.68 |

TABLE 3-continued

| | Urban/Suburban | Rural |
|---|---|---|
| 1732 m ISD | 0.76 | 0.67 |
| 3000 m ISD | 0.78 | 0.73 |
| 7000 m ISD | 0.83 | 0.78 |

Figure 5:
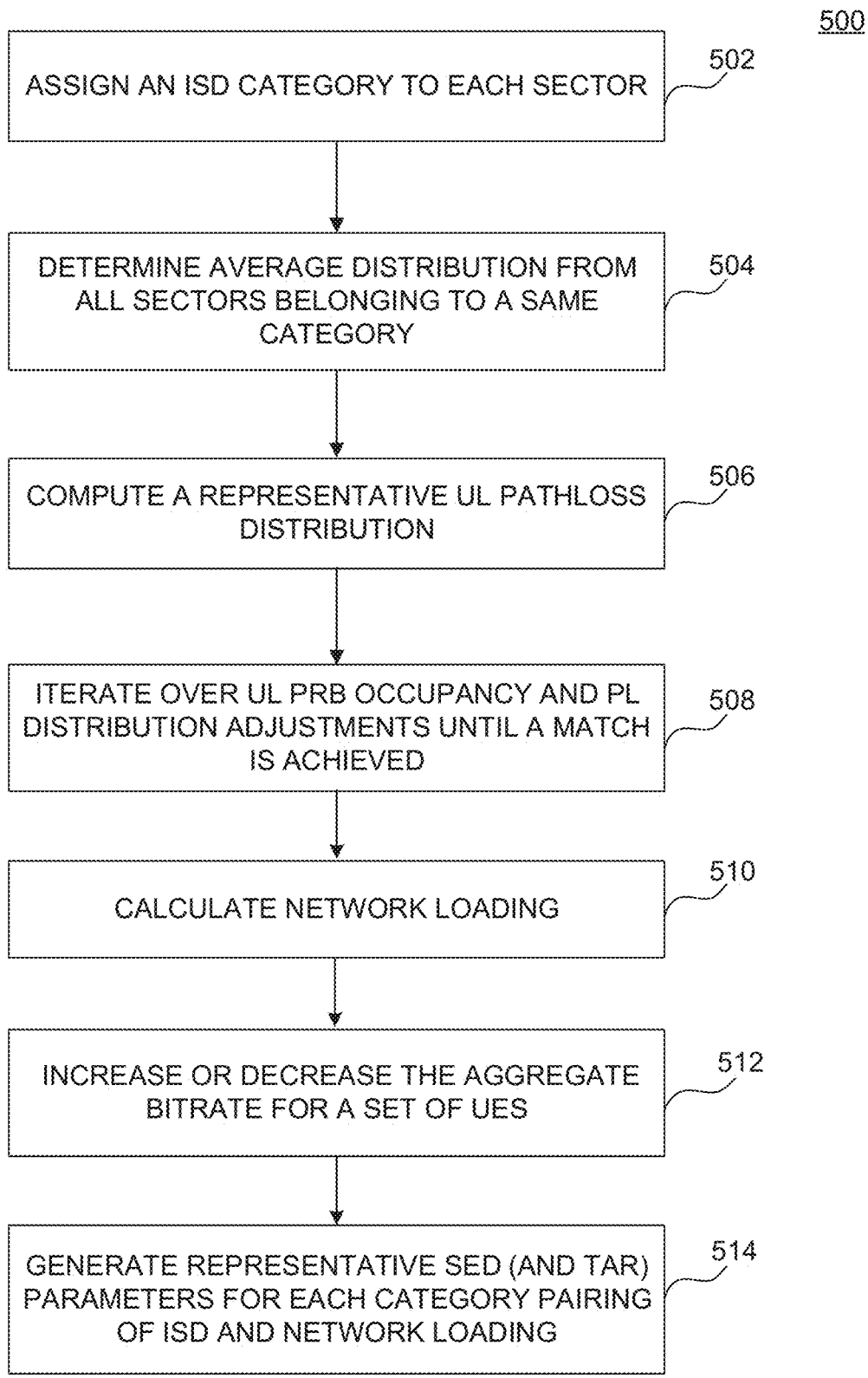
FIG. 5 illustrates a process diagram for implementing sector-based aggregate interference predictions, according to some embodiments.

Matching both UL pathloss distribution and network loading is difficult because the two metrics are interdependent. The UL pathloss distribution is derived from a histogram that accumulates one sample per uplink emission, or could be a theoretical UL pathloss distribution. UEs with more traffic will have more emissions and contribute more UL pathloss samples. In some embodiments, random sampling 414 of the sector EIRP distribution may be implemented. The TTI activity rate 408 is compared 416 with the output of a random number generator on the closed interval [0, 1] (U [0, 1]) 418 and aggregated with the random sampling 414 of the sector EIRP distribution output to generate the aggregated Sector EIRP per TTI 420. In some non-limiting embodiments U [0, 1] is implemented as a uniform random number generator. For example, a sample is drawn from U [0, 1] and compared with the TTI occupancy expected value which also between 0 and 1. If the sample is less than the expected value of TTI occupancy, a sample is drawn from the sector wide EIRP distribution, otherwise it is assumed the sector radiated no power during that TTI, FIG. 5 illustrates a process diagram for implementing sector-based aggregate interference predictions, according to some embodiments. Method 500 can be performed by processing logic that can comprise hardware (e.g., circuitry, dedicated logic, programmable logic, microcode, etc.), software e.g., instructions executing on a processing device), or a combination thereof. It is to be appreciated that not all processes may be needed to perform the disclosure provided herein. Further, some of the processes may be arranged in a different order than shown in FIG. 5, as will be understood by a person of ordinary skill in the art.

A valid emulation simultaneously matches the target UL pathloss distribution as well as the target network loading. This is done by adjusting the pathloss experienced by each LTE as well as the application traffic for each UE.

As previously described, matching both UL pathloss distribution and network loading is difficult because the two metrics are interdependent. UEs with more traffic will have more emissions and contribute more UL pathloss samples. UEs with high pathloss are also more likely to use more resources due to lower signal to noise ratios caused by limited maximum transmit power. For this reason, each sector emulation is an iterative process.

At a high-level description, the UL pathloss distribution is matched first, and then the aggregate traffic is incrementally adjusted to tune the network loading on the sector while preserving (i.e., substantially matching) the UL pathloss distribution.

In some embodiments, the testbed cannot alter the pathloss experienced by a UE on a TTI-by-TTI basis. Therefore, it is necessary to establish a sector target UL pathloss distribution by assigning each UE an average pathloss such that the resulting distribution substantially matches the target distribution as closely as possible. This is achieved by multiplying each pathloss bin's relative frequency by the number of UEs in the emulation and rounding the product to the nearest integer, resulting in a count of UEs to be assigned to each pathloss. If there are remaining UEs, the pathloss bins with IX, counts of zero are sorted by their relative frequencies, and a UE is assigned to the pathloss having the largest relative frequency.

As a numerical example of this process, consider a pathloss bin with a relative frequency of 0.07. The value 0.07 is multiplied by the number of UEs in the emulation, for example, 21, resulting in a product of 1.47, The product is then be rounded down to 1 and consequently the pathloss is assigned to one UE.

In 502, a category is assigned to each sector in the same data corpus. In some embodiments, assume there exists a category algorithm which can classify any given sector into an emission category 402 and a network loading category 404. In a non-limiting example, one embodiment of a sector emissions model are compatible with sector categorization algorithms 405 for categorizing sectors.

In 504, an average distribution is calculated for all sectors belonging to a similar category. For example, for each category, a representative UL pathloss distribution is calculated by considering the average distribution from all sectors belonging to the same category. In 506, a representative UL pathloss distribution is calculated.

In 508, the pathloss assignments are realized by adjusting the attenuation on the RF path between the LTEs and eNodeB such that the Received Signal Received Power (RSRP) measured by the UEs reflect the pathloss assignments. A channel model is also used to modulate the pathloss of each UE over time. In this manner, the average pathloss of a UE may be fixed, but its pathloss at each can vary. The PL distribution is calculated at the eNodeB by measuring the PL of every transmission. The PL distribution may be adjusted by forcing a fit of the target PL by adjusting an on and off time of the UI's (e.g., phone) data session. Either the session times or the time between sessions can be adjusted.

Once the UL pathloss distribution is matched as closely as possible, the network loading is matched while preserving the LI pathloss distribution. In 510, network loading is calculated, for example, for each UE (e.g., phone), having a different pathloss, and fills its resource blocks with a different amount of padding, requiring custom adjustments to meet the target PRIG occupancy. For example, phones with a good signal strength would stay on the network longer, transmitting buffer status reports that only contain padding.

In 512, the sector's network loading is adjusted by tuning the traffic bitrate (increase/decrease) on each UE in an iterative manner. The first iteration is a baseline in which each UE transmits at an identical average bitrate. After the network loading for the baseline run is calculated, control scripts are modified to increase or decrease the aggregate bitrate for a set of UEs. Because network loading is based on PRBs instead of bits, the modification logic (see below) considers the average amount of useful data per transport block and may increase or decrease the bitrate more than expected to push the eNodeB scheduler to assign more or fewer PRBs to transmit. This process is repeated until the KPIs indicate network loading is within 5% of the target value.

$$F_{adjustment} = \frac{PRBUtil_{target}}{PRBUtil_{observed}} * \frac{Bits_{total}}{Bits_{total} - Bits_{padding}}$$

$$\text{Throughput}_{new}(i_{UE}) = \text{Throughput}_{UE}(i_{UE}) * F_{adjustment}$$

In 514, the testbed emulation generates representative SED (and TAR) parameters for each category and network loading pairing.

In some embodiments, the output data of each sector emulation includes information regarding the transmit power and resource allocations of every UL emission from each UE. Different EIRP distributions can be generated using the fine-grain information collected during an emulation.

In some embodiments, to create EIRP distributions, the recorded UE transmit powers must be adjusted to reflect real-world characteristics that are not reflected by the emulation. Antenna loss is subtracted from the reported power to account for the reduction in radiated power due to non-ideal antennas on UEs. To account for the presence of indoor UEs in the sector and the effect of building penetration losses, a percentage of LE transmission powers are reduced accordingly, generally by a constant amount.

In a non-limiting working example, the following adjustments may be made: 3 dB was subtracted as antenna loss, a random 80% of all transmissions were chosen to be emissions from indoor UEs, and an additional 20 dB was subtracted from those emissions. These adjustments may be consistent with assumptions made in 3GPP working group simulations.

In some embodiments, the physical layer UL network loading is defined as the mean rate of UL PRBs used in the sector in each TTI. In Network loading is influenced by UE traffic needs, the RF environment, and the eNodeB scheduling algorithm. According to this definition of network loading, network loading is a metric that is measured after-the-fact and can be derived from an eNodeB's PRB utilization KPI. In the following, this definition of network loading is assumed.

A sector's total UL EIRP is dependent on the network loading since a higher utilization of PRBs is a necessary precondition for, and creates the possibility of, higher total power being emitting from the sector. Furthermore, UE transmit power scales with the number of PRBs being used for transmission.

Figure 6A:
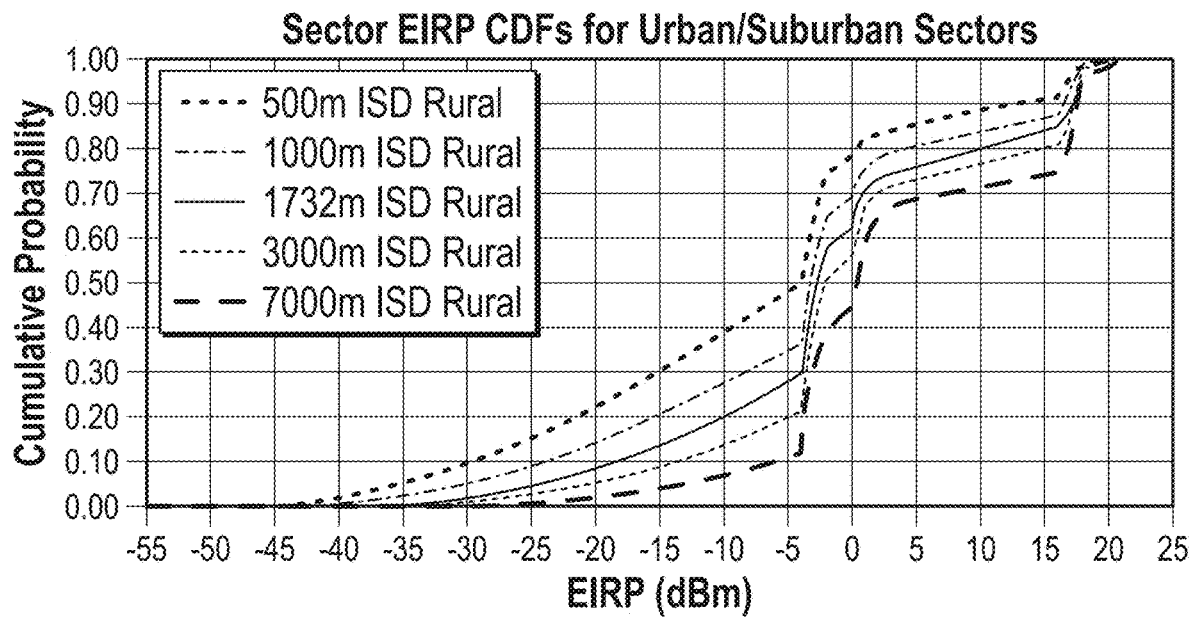
Figure 6B:
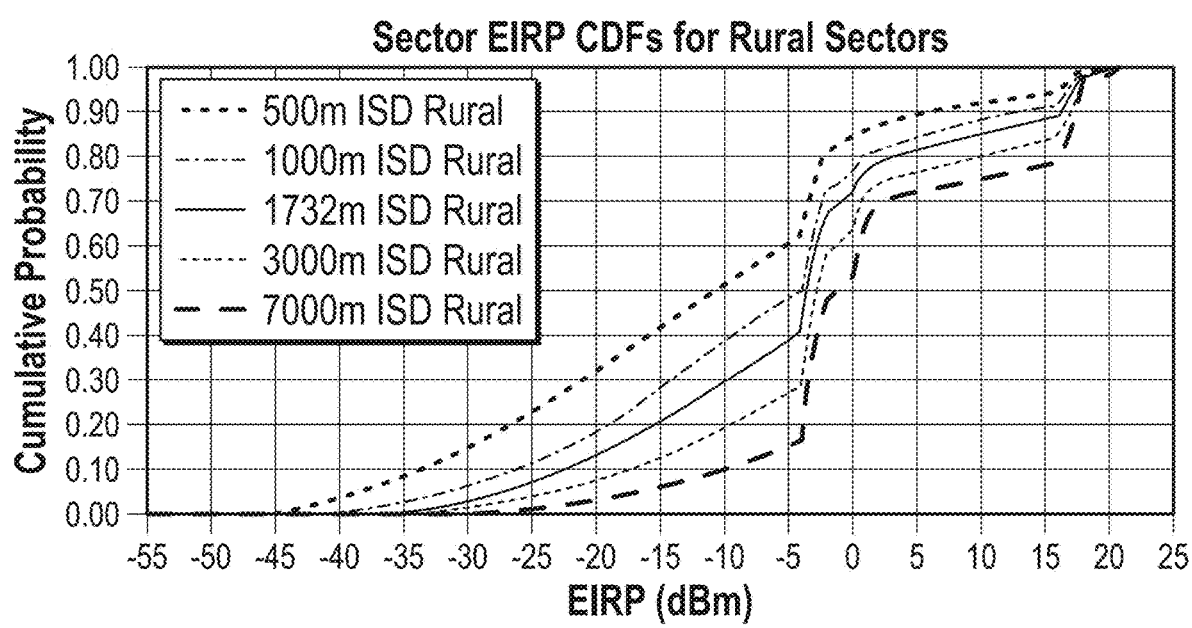

FIGS. 6A and 6B, collectively illustrate example sector EIRP CDFs (Cumulative Distribution Function) for urban/suburban and rural sectors, as per some embodiments. In some embodiments, a transition of macro cell sector categories is made from the current morphology ("urban/suburban" and "rural") model to one based on inter-sector distance (ISI)), In a non-limiting example, the size of a sector drives UE EIRP dynamics to a greater extent than the morphology of the sector. ISI) categories may be chosen based on trends seen in real world networks.

In some embodiments, the technology described herein implements a specific set of SED and TAR values to be used with the ISD categories and morphology categories (e.g., urban/suburban/rural). In this example embodiment, one embodiment of a sector emissions model are compatible with algorithms for categorizing AWS-3 LTE sectors. TAR and SED values may be generated for each of a plurality (e.g., ten) possible combinations of emission and network loading categories using the testbed and AWS-1 data corpus.

Figure 7A:
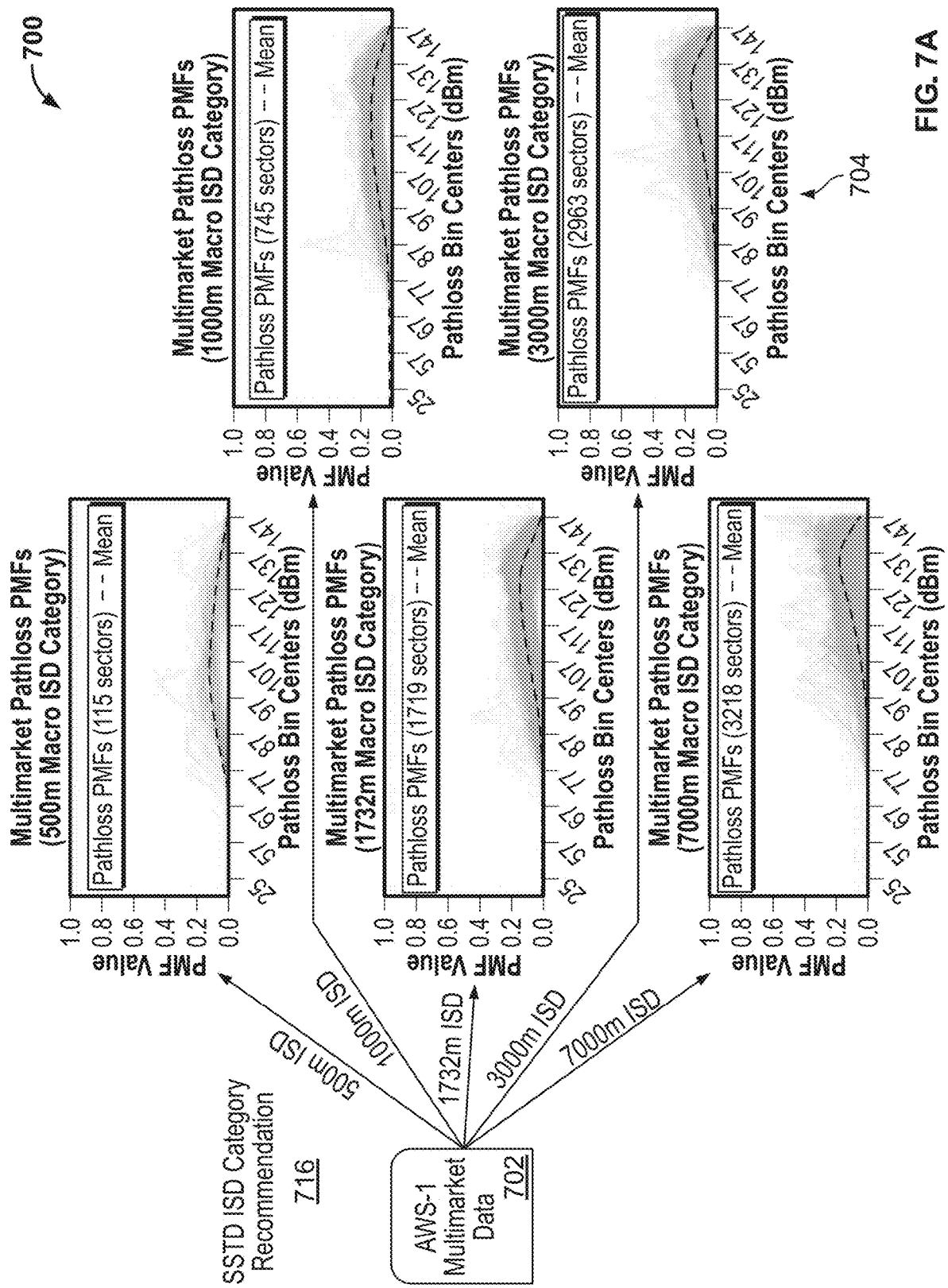
Figure 7B:
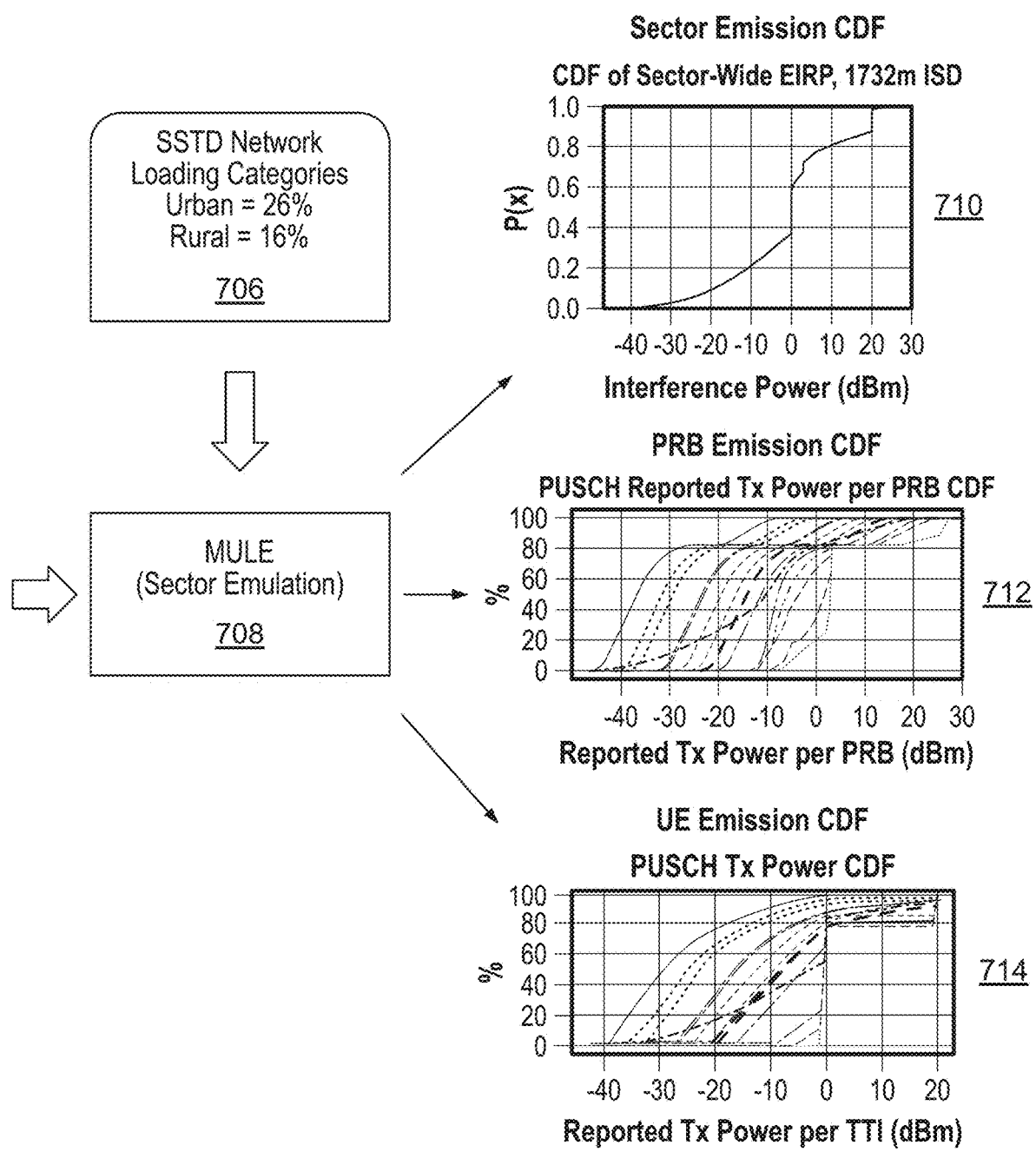

FIGS. 7A and 7B collectively illustrate a flow chart describing the generation of EIRP distributions using the testbed. In some embodiments, the technology described herein predicts SED and TAR parameters. At a high level, it consists of three steps: for each category, compute a representative UL pathloss distribution 704 from the data corpus 702 by considering the average distribution from all sectors belonging to the same category; use the representative pathloss distribution, along with representative network loading levels 706, as forcing parameters to drive accurate sector emulation 708 using the testbed and use detailed UL emission information CDFs (Cumulative Distribution Functions) as shown for sector emissions 710, PRB Emissions 712 and UE emissions 714. In some embodiments, the testbed emulation generates representative SED (and TAR) parameters for each category and network loading pairing.

In some embodiments, PL is strongly correlated with UL emission power. This may be motivated by the LTE power control equation, which specifies that LTE transmit power (in dBm) is proportional to the estimated PL (in dB scale). VIE PL is estimated by the eNodeB to inform scheduling decisions, and statistics about the UL PL in each TTI can be recorded as a KPI.

To create representative PL distributions from the data corpus, each sector may be assigned to a category 716 based, for example, on a 90th percentile of their UE connection distances. The 90th percentile value may be chosen over the max distance to filter out unrealistic, erroneous samples that may sometimes be present in the data, and to be consistent with the metric used to validate the nearest neighbor category algorithm for a category. A non-limiting example category assignment scheme is shown in Table 4.

TABLE 4

| $90^{th}$ Percentile of UE Connection Distance (m) | Category (m) | Representative Sector Radius |
|---|---|---|
| ≤375 | 500 | 250 m |
| (375, 683] | 1000 | 500 m |
| (683, 1183] | 1732 | 866 m |
| (1183, 2500] | 3000 | 1500 m |
| >2500 | 7000 | 3500 m |

FIG. 8 illustrates example plots of the UL PL distributions in the data corpus for each of a plurality of categories, according to some embodiments. A time-independent estimate of each sector's typical UL pathloss distribution obtained by aggregating each sector's UL pathloss distributions over all KPI collection times and normalizing by the number of samples. Finally, a single representative distribution may be obtained for each category by aggregating the distributions over all sectors in the category and normalizing by the number of sectors. The resulting representative UL pathless distributions are shown as dotted black lines. FIG. 8 plots also show the individual time-independent estimates of each sector's typical UL pathless distribution. It can be observed that the representative distributions shift towards higher pathless in categories of increasing distance. This fits the intuition that the typical pathless in a sector should increase if more UEs are connecting from farther away.

FIG. 9 illustrates an EIRP resource grid 900, as per some embodiments. 3GPP standards specify that uplink transmissions have the same average transmit power over all allocated frequency resources (i.e., PRBs). Using this information, it is possible to construct a time-frequency resource grid that indicates the theoretical EIRP present in each PRB of each TTI in the testbed emulation.

In this example illustration, readings from the testbed are "transformed" to derive the sector EIRP distribution. In one embodiment, the testbed provides the power of each transmission and the number of PRBs consumed by each transmission (and the PRB assignments). Using a 3GPP standard, the grid in FIG. 9 can be created, by computing the power per PRB for each transmission (power of the transmission divided by number of PRBs) and assigning (attributing) that power to the PRBs used for the transmission.

As shown, the total number of PRBs is 16, and the total number of TTIs elapsed is 12. In each TTI (i.e., column), the tiles indicate PRB resources occupied by UE emissions. The EIRP of each occupied PRB is given by the numbers in the corresponding tile of the grid. Contiguous blocks of the same shade within each TTI correspond to emissions from a single UE. Blocks 902 (value of 0,833) correspond to a total ERP of 10 mW (10 dBm); blocks 904 (values of 1 or 2) correspond to a total UE EIRP of 8 mW (9 dBm); and blocks 906 (values 0.25 or 0.5) correspond to a total UE EIRP of 2 mW (3 dBm).

FIG. 10 illustrates this computation using the example grid 900 from FIG. 9. For example, as shown in FIG. 10, TTI 1 (1002) has EIRP contributions of 8 mW (from 904) and 2 mW (from 906) for a total of 10 mW as shown. As shown, a similar computation may be made for each TTI. The TAR is computed by dividing the number of TTIs with non-zero contributions by the total number of TTIs, FIG. 11 illustrates a Sector EIRP Distribution (SED) computed by creating a normalized histogram 1102 of the non-zero values of total EIRP contributions 1104 as shown in 10 (e.g., 1002). For example, there were 5 counts (1106) of 10 mW total EIRP contributions. These 5 counts reflect 50% (0.5) 1108 of the total EIRP contributions. The SED and TAR values provided may be derived in this manner using data obtained from the testbed.

In various embodiments, a sector-wide model considers the total sector EIRP as a single random variable per TIT One embodiment of a sector emissions model is a sector-wide model. In each TTI, the total UL EIRP contribution from the sector is parameterized by the SED and the TAR which are defined as follows: TTI Activity Rate (TAR)—specifies the probability that the sector has at least one transmitting UE in a randomly chosen TTI; Sector EIRP Distribution (SED) Specifies a random variable which models the combined EIRP of one or more UEs transmitting in the same TTI within a sector. The computation TAR and SED can be explained as a series of operations applied to the EIRP resource grid. The EIRP per PRB is summed over all PRBs in each TTI to obtain the total EIRP contribution from all the UEs in the emulated sector at each TIT The technology described herein illustrates the complicated behavior of LE emissions, which can be directly captured through real-world emulation informed by empirical data gathered from existing cellular networks. In this manner, higher fidelity emission models can be developed without a dramatic increase in model complexity and, therefore, simple, yet accurate, models for interference prediction can improve spectrum sharing between commercial cellular and US government systems.

Various embodiments can be implemented, for example, using one or more computer systems, such as computer system 1200 shown in FIG. 12. Computer system 1200 can be any well-known computer capable of performing the functions described herein.

Computer system 1200 includes one or more processors (also called central processing units, or CPUs), such as a processor 1204. Processor 1204 is connected to a communication infrastructure or bus 1206.

One or more processors 1204 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 also includes user input/output device(s) 1203, such as monitors, keyboards, pointing devices, etc., that communicate with communication infrastructure 1206 through user input/output interface(s) 1202.

Computer system 1200 also includes a main or primary memory 1208, such as random access memory (RAM). Main memory 1208 may include one or more levels of cache. Main memory 1208 has stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 reads from and/or writes to removable storage unit 1218 in a well-known manner.

According to an exemplary embodiment, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may al low computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skil led in the relevant art(s) how to make and use embodiments of this disclosure using data processing devices, computer systems and/or computer architectures other than that shown in FIG. 12. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" anchor "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for deriving a sector uplink (IX) power distribution, the method comprising:

emulating, utilizing a cellular testbed, User Equipment (UE) emissions from a plurality of UEs, wherein the emulating is performed during a collection interval, and wherein the emulating comprises:
  establishing a sector target UL pathloss distribution for the plurality of UEs within a cellular sector, the establishing comprising:
    operating each of the plurality of UEs with an average pathloss that substantially matches the sector target UL pathloss distribution; and
    iteratively incrementally adjusting a pathloss of each of the plurality of UEs until matching the sector target UL pathloss distribution; and
  iteratively establishing a target network loading by incrementally adjusting network loading on the cellular sector while preserving the sector target UL pathloss distribution;
recording, after each iteration, the UE emissions of each of the plurality of UEs; and
capturing, during the collection interval, the sector uplink power distribution by aggregating, based on the recorded UE emissions, UL pathloss distributions.

2. The method of claim 1, further comprising assigning pathloss assignments to each of the plurality of UEs by adjusting an attenuation on an RF path between each of the plurality of UEs and a cellular base node of the cellular testbed.

3. The method of claim 1, wherein the iteratively incrementally adjusting the pathloss of each of the plurality of UEs further comprises: multiplying a pathloss binned relative frequency by a number of the plurality of UEs and rounding the product to a nearest integer, resulting in a count of the plurality of UEs to be assigned to each pathloss.

4. The method of claim 3, wherein if there are remaining UEs, from the plurality of UEs not assigned to each pathloss, any pathloss bins with UE counts of zero are sorted by their relative frequency and the remaining UEs are assigned to the pathloss having a largest relative frequency.

5. The method of claim 1, wherein the iteratively incrementally adjusting the network loading on the cellular sector comprises: adjusting an aggregate bitrate for the plurality of UEs.

6. The method of claim 1, further comprising, for a plurality of cellular sectors, assigning one or more of an emission category or network loading category to the cellular sectors.

7. The method of claim 6, further comprising calculating an average pathloss distribution for a plurality of sectors belonging to a similar category.

8. The method of claim 1, further comprising, utilizing a channel model, modulating the pathloss of each of the plurality of UEs, over the collection interval, to vary the pathloss for a Transmission Time Interval (TTI).

9. The method of claim 1, wherein the iteratively establishing the target network loading further comprises adjusting an on and off time of a data session of each of the plurality of UEs.

10. The method of claim 9, wherein the adjusting the on and off time further comprises adjusting session times or a time between sessions.

11. The method of claim 1, wherein the incrementally adjusting network loading is performed, for each of the plurality of UEs, by filling resource blocks of the plurality of UEs with a different amount of padding.

12. The method of claim 1, wherein the incrementally adjusting the network loading is performed, for each LIE, by tuning a traffic bitrate on each of the plurality of UEs.

13. The method of claim 1, wherein the incrementally adjusting the network loading on the cellular sector is performed until the network loading is within 5% of a value of the target network loading.

14. The method of claim 1, further comprising generating the sector target UL pathloss distribution based on key performance indicators from an historical dataset.

15. The method of claim 1, wherein the recording the UE emissions of each of the plurality of UEs comprises recording a Transmission Time Interval (TTI), a total power, and physical resource blocks (PRBs) that each of the plurality of UEs transmitted at.

16. A system for deriving a sector uplink power distribution, the system comprising:
  a cellular testbed configured to emulate User Equipment (UE) emissions from a plurality of UEs, wherein the emulating is performed over a collection interval, and wherein the emulating comprises:
    establishing a sector target uplink (UL) pathloss distribution for the plurality of UEs within a cellular sector, the establishing comprising:
      operating each of the plurality of UEs with an average pathloss that substantially matches the sector target UL pathloss distribution; and
      iteratively incrementally adjusting the pathloss of each of the plurality of UEs until matching the sector target uplink (UL) pathloss distribution; and
    iteratively establishing a target network loading by incrementally adjusting network loading on the cellular sector while preserving the sector target UL pathloss distribution;
  recording, after each iteration, the LE emissions of each of the plurality of UEs; and
  the deriving further comprising capturing, during the collection interval, the sector uplink power distribution by aggregating, based on the recorded UE emissions, UL pathloss distributions.

17. The system of claim 16, wherein the cellular testbed includes at least a cellular base node channel emulator.

18. The system of claim 16, the deriving further comprising assigning pathloss assignments to each of the plurality of UEs by adjusting an attenuation on an RF path between each of the plurality of UEs and a cellular base node of the cellular testbed.

19. The system of claim 16, wherein the incrementally adjusting the network loading on the cellular sector further comprises: adjusting an aggregate bitrate for the plurality of UEs.

20. A non-transitory computer-readable device having instructions stored thereon that, when executed by at least one computing device, cause the at least one computing device to perform operations comprising:
  emulating, utilizing a cellular testbed, User Equipment (UE) emissions from a plurality of UEs, wherein the emulating is performed during a collection interval, and wherein the emulating comprises:
    establishing a sector target uplink (UL) pathloss distribution for the plurality of UEs within a cellular sector, the establishing comprising:
      operating each of the plurality of UEs with an average pathloss that substantially matches the sector target UL pathloss distribution; and
      iteratively incrementally adjusting the pathloss of each of the plurality of UEs until matching the sector target UL pathloss distribution; and iteratively establishing a target network loading by incrementally adjusting network loading on the cellular sector while preserving the sector target UL pathloss distribution;

recording, after each iteration, the UE emissions of each of the plurality of UEs; and capturing, during the collection interval, the sector uplink power distribution by aggregating, based on the recorded UE emissions, UL pathloss distributions.

* * * * *